US012092314B2

(12) United States Patent
Rogers

(10) Patent No.: US 12,092,314 B2
(45) Date of Patent: Sep. 17, 2024

(54) ILLUMINATED GUITAR STAND SYSTEM, RETROFIT KIT, AND METHOD THEREOF

(71) Applicant: Keith Harrison Rogers, Franklin, TN (US)

(72) Inventor: Keith Harrison Rogers, Franklin, TN (US)

( * ) Notice: Subject to any disclaimer, the term of this patent is extended or adjusted under 35 U.S.C. 154(b) by 190 days.

(21) Appl. No.: 17/942,412

(22) Filed: Sep. 12, 2022

(65) Prior Publication Data

US 2024/0085014 A1 Mar. 14, 2024

(51) Int. Cl.

| | |
|---|---|
| ***F21V 33/00*** | (2006.01) |
| ***F21V 23/00*** | (2015.01) |
| ***F21V 23/04*** | (2006.01) |
| ***G10D 3/00*** | (2020.01) |
| ***G10G 5/00*** | (2006.01) |
| *F21Y 115/10* | (2016.01) |

(52) U.S. Cl.

CPC ........ *F21V 33/0052* (2013.01); *F21V 23/002* (2013.01); *F21V 23/0435* (2013.01); *F21V 33/0056* (2013.01); *G10D 3/00* (2013.01); *G10G 5/00* (2013.01); *F21Y 2115/10* (2016.08)

(58) Field of Classification Search

CPC ............. F21V 33/0052; F21V 33/0056; F21V 23/002; F21V 23/0435; G10D 3/00; G10G 5/00

See application file for complete search history.

(56) References Cited

U.S. PATENT DOCUMENTS

| | | | | |
|---|---|---|---|---|
| 9,230,519 B1 * | 1/2016 | Beller | G10D 3/00 | |
| 2007/0125222 A1 * | 6/2007 | Clifford | G10G 5/00 | 84/327 |
| 2010/0181441 A1 * | 7/2010 | Yu | G10G 5/00 | 248/176.1 |
| 2015/0122960 A1 * | 5/2015 | Eward | G10G 5/00 | 248/231.91 |

* cited by examiner

*Primary Examiner* — Evan P Dzierzynski
*Assistant Examiner* — Nathaniel J Lee
(74) *Attorney, Agent, or Firm* — Patterson Intellectual Property Law, P.C.; Samuel A. Raque

(57) ABSTRACT

A musical instrument display system, retrofit kit, and method of assembly is disclosed herein. The musical instrument display system is configured to illuminate a stringed instrument received by a ground supported musical instrument stand. The musical instrument display system may comprise a musical instrument stand having a pair of lower support arms for supporting an enlarged body of the musical instrument and a pair of upper support arms for stabilizing a narrow neck of the musical instrument, a plurality of illumination modules coupled to a free end of each of the pairs of lower and upper support arms and configured to project light along a front side of the musical instrument, and an electronics control module coupled to the musical instrument stand and each of the plurality of illumination modules for controlling an operational state of the plurality of illumination modules.

20 Claims, 11 Drawing Sheets

ILLUMINATED GUITAR STAND SYSTEM, RETROFIT KIT, AND METHOD THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to freestanding instrument storage stands. More particularly, the present disclosure pertains to a freestanding instrument storage stand with lights for illuminating and displaying an instrument supported by the stand.

2. Description of the Prior Art

Musical instruments are commonly placed in storage cases to protect the instruments from damage and to keep the musical instruments clean. Once placed in cases, the musical instruments are often tucked away and stored out of sight. However, some instruments are made using painstaking and time consuming manufacturing processes. Such processes include handcrafting various string instruments such as violins, cellos, and guitars, or various brass instruments such as trumpets or French horns. An owner of such an instrument might want to display the instrument because of the craftsmanship that went into making the instrument, rather than putting the instrument into a case.

To remedy this, owners can turn to stands that sit on the floor and hold the instrument. For example, a guitar stand typically includes a base to prevent the instrument and stand from tipping and a portion that extends vertically from the base to hold the instrument. However, placing instruments in such stands that sit on the floor may create tripping or other hazards, while also interfering with the aesthetic display of the musical instrument when not being used.

BRIEF SUMMARY

In view of at least some of the above-referenced problems in conventional instrument stands, an exemplary object of the present disclosure may be to provide a new and improved apparatus, system, and method for storing and displaying a musical instrument utilizing front lit illumination. An exemplary feature of the present invention may be to provide a kit that allows using to alter their currently owned instrument stands in order to provided the herein disclosed illumination features.

In a particular embodiment, an exemplary musical instrument display system as disclosed herein for illuminating a stringed musical instrument characterized as having an enlarged body and a narrow neck extending therefrom. The musical instrument display system may include a musical instrument stand, a plurality of illumination modules, and an electronics housing. The musical instrument stand may have a base portion configured to be supported by a ground surface, a lower instrument support portion having a pair of lower arms configured to support the enlarged body the stringed musical instrument above the ground surface, and an upper instrument support portion vertically offset from the lower instrument support portion and having a pair of upper arms configured to receive the narrow neck of the stringed musical instrument therebetween when the stringed musical instrument is received by the musical instrument stand. At least one of the plurality of illumination modules may be coupled to each of the pair of lower arms for projecting light upwards along a front surface of the stringed musical instrument when the stringed musical instrument. At least one other of the plurality of illumination modules may be coupled to each of the pair of upper arms for projecting light downwards along the front surface of the stringed musical instrument when the stringed musical instrument. The electronics housing may be coupled to the musical instrument stand and including an electronics module positioned therein. The electronics module may be electrically coupled to each of the plurality of illumination modules using a plurality of cables for selectively transmitting power to each of plurality of illumination modules.

In an exemplary aspect according to the above-referenced embodiment, the electronics module may be configured to be coupled to and receive power from an AC power source external to the electronics housing.

In another exemplary aspect according to the above-referenced embodiment, the electronics housing may be configured to receive at least one battery configured to provide power to each of the plurality of illumination modules.

In another exemplary aspect according to the above-referenced embodiment, the musical instrument display system may further include a power switch coupled to one of the electronics housing or the musical instrument stand and configured to control transmission of power from the electronics module to the plurality of illumination modules.

In another exemplary aspect according to the above-referenced embodiment, the musical instrument stand may further include an internal cavity open between the pair of lower arms and the pair of upper arms. In accordance with such this aspect, the plurality of cables may be positioned within the internal cavity.

In another exemplary aspect according to the above-referenced embodiment, each of the pair of lower arms may include an opening configured to at least partially receive one of the plurality of illumination modules and each of the pair of upper arms may include an opening configured to at least partially receive one of the plurality of illumination modules.

In another exemplary aspect according to the above-referenced embodiment, the opening of each of the pair of lower arms and the opening of each of the pair of upper arms may be positioned proximate to a respective free end thereof.

In another exemplary aspect according to the above-referenced embodiment, the electronics housing may be defined at least partially by the internal cavity.

In another exemplary aspect according to the above-referenced embodiment, each of the electronics housing, the plurality of cables, and the plurality of illumination modules may be removably coupled to an exterior of the musical instrument stand and collectively define a retrofit kit.

In another exemplary aspect according to the above-referenced embodiment, the electronics module may be coupled to a wireless transceiver positioned within the electronics housing and configured to receive signals from an external device for controlling an operational state of the plurality of illumination modules.

In another exemplary aspect according to the above-referenced embodiment, each of the plurality of illumination modules may comprise at least one light emitting diode.

In another embodiment, an exemplary method of assembling a musical instrument illumination system as disclosed herein may include step (a) providing a musical instrument stand having at least one of a pair of lower support arms or a pair of upper support arms; and step (b) installing illumination devices at or proximate to a free end of each of the pair of lower support arms and each of the pair of upper support arms such that the illumination devices coupled to the pair of lower support arms are configured to project light at least partially in an upward direction and the illumination devices coupled to the pair of upper support arms are configured to project light at least partially in a downward direction.

In an exemplary aspect according to the above-referenced embodiment, the method may further include activating the illumination devices; and projecting light from the illumination devices onto a front surface of a musical instrument when received by the musical instrument stand.

In another exemplary aspect according to the above-referenced embodiment, the method may further include controlling a color of light produced by each of the illumination devices.

In another exemplary aspect according to the above-referenced embodiment, the method may further include receiving communications from an external device to control the color of the light produced by each of the illumination devices.

In another exemplary aspect according to the above-referenced embodiment, the step (b) of the method may further include positioning each of the illumination devices into an opening defined at or proximate to the free end of each of the pair of lower support arms and each of the pair of upper support arms.

In another exemplary aspect according to the above-referenced embodiment, the method may further include, prior to step (b), providing a retrofit kit comprising the illumination devices, an electronics control module, and a plurality of cables configured to be coupled between the illumination devices and the electronics control module.

In another exemplary aspect according to the above-referenced embodiment, the method may further include installing an electronics control module onto or within musical instrument stand; and electrically coupling each of the illumination devices to the electronics control module using cables.

In another exemplary aspect according to the above-referenced embodiment, the method may further include providing power to the electronics control module using a battery.

In further embodiment, a musical instrument display system as disclosed herein may include a ground supported musical instrument stand for supporting a stringed musical instrument. The musical instrument display system may further include illumination means coupled to the ground supported musical instrument stand for projecting light along a front side of the stringed musical instrument received by the ground supported musical instrument stand. The musical instrument display system may further include a power control means coupled to the ground supported musical instrument stand and the illumination means for selectively enabling the illumination means.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
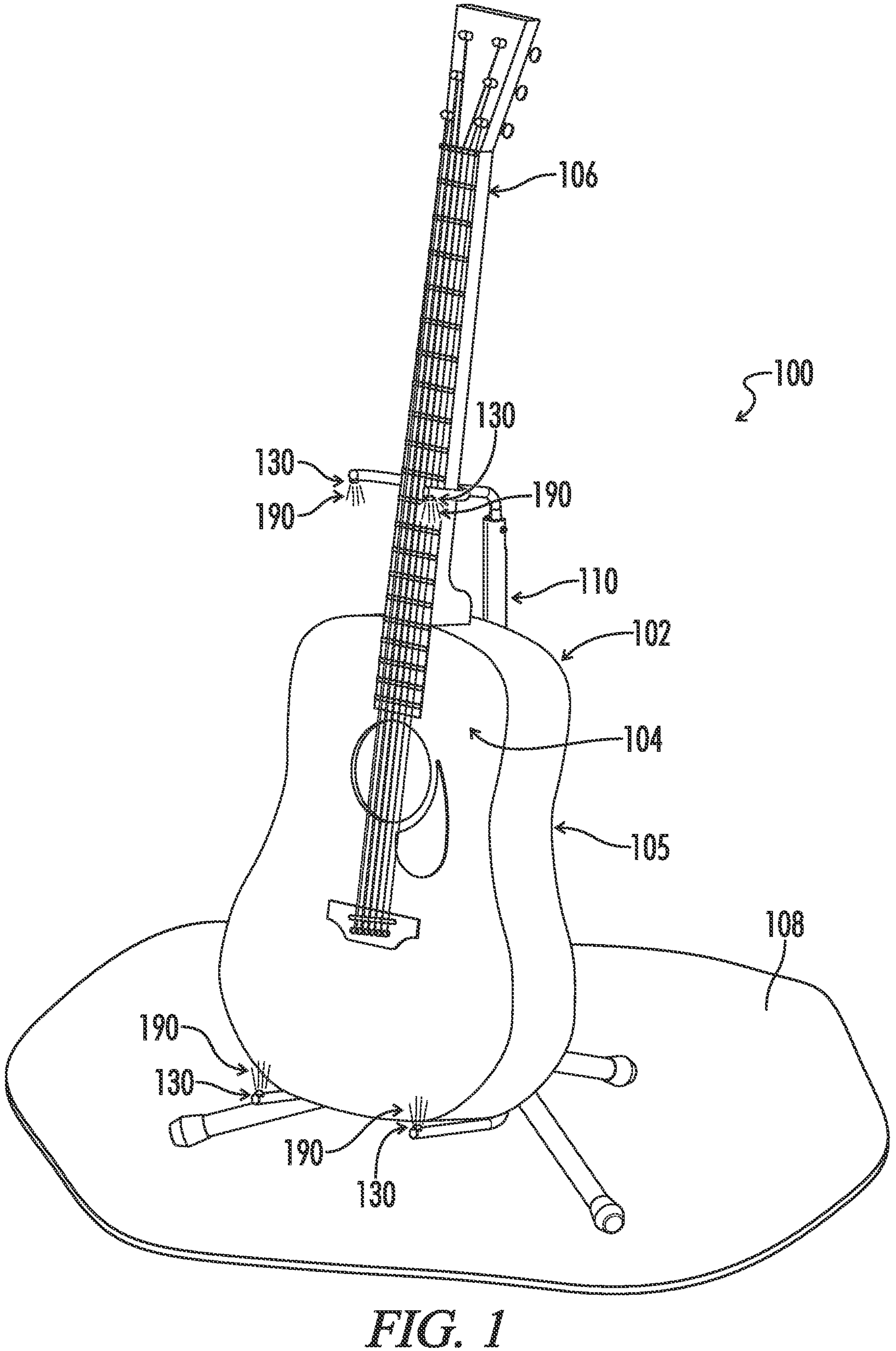
FIG. 1 is a perspective view of a musical instrument display system in combination with a musical instrument in accordance with the present disclosure.

Referring to FIGS. 1-3A, 4-8, a musical instrument display system 100 for illuminating a front side 104 of a musical instrument 102 when stored is shown (the musical instrument 102 being shown in FIG. 1 only). The musical instrument 102 may also be referred to herein as a stringed musical instrument 102. The front side 104 may also be referred to herein as a front surface 104. The musical instrument 102 may include an enlarged body 105 and a narrow neck 106 extending from the enlarged body 105.

The musical instrument display system 100 may include a musical instrument stand 110 for supporting the musical instrument 102, a plurality of illumination modules 130 coupled to the musical instrument stand 110 for projecting light 190 along a front side 104 of the musical instrument 102 when received by the musical instrument stand 110, and an electronics control module 140 coupled to the musical instrument stand 110 and each of the plurality of illumination modules 130 for selectively enabling the plurality of illumination modules 130. The musical instrument stand 110 may also be referred to herein as a ground supported musical instrument stand 110 because the musical instrument stand 110 is generally configured to be supported by a ground surface 108 (shown in FIG. 1). The plurality of illumination modules 130 may also be referred to herein as illumination devices 130, illumination means 130, or the like. Each of the plurality of illumination modules 130 may comprising one or more light-emitting diodes (LEDs) positioned within a module housing. The module housing may further include one or more of a reflector, a deflector, a lens, or the like.

The musical instrument stand 110 may include a base portion 112 configured to be supported by the ground surface 108 (shown in FIG. 1). The musical instrument stand 110 may further include a lower instrument support portion 114 having a pair of lower arms 116 configured to support the enlarged body 105 of the musical instrument 102. The musical instrument stand 110 may still further include an upper instrument support portion 118 vertically offset from the lower instrument support portion 114 and having a pair of upper arms 120 configured to receive the narrow neck 106 of the musical instrument 102 therebetween when the musical instrument 102 is received by the musical instrument stand 110. The lower and upper instrument support portions 114, 118 may be coupled together using a post or pipe 122.

In certain embodiments, at least one of the plurality of illumination modules 130 may be coupled at or proximate to a free end 117 each of the pair of lower arms 116 and oriented for projecting light 190 upwards along the front side 104 of the musical instrument 102 when received by the musical instrument stand 110. In other embodiments, at least one of the plurality of illumination modules 130 may be coupled at or proximate to a free end 121 of each of the pair of upper arms 120 and oriented for projecting light 190 downwards along the front side 104 of the musical instrument 102 when received by the musical instrument stand 110.

The electronics control module 140 may be integrated or positioned within an electronics housing 142 which may be coupled to the musical instrument stand 110 using any coupling means now known or to be discovered. The electronics control module 140 may also be referred to herein as an electronics module 140, power control means 140, or the like. The electronics control module 140 may be electrically coupled to each of the plurality of illumination modules 130 using a plurality of cables 144, shown in FIGS. 2-3B and 6, for selectively transmitting power to each of the plurality of illumination modules 130.

Figure 9:
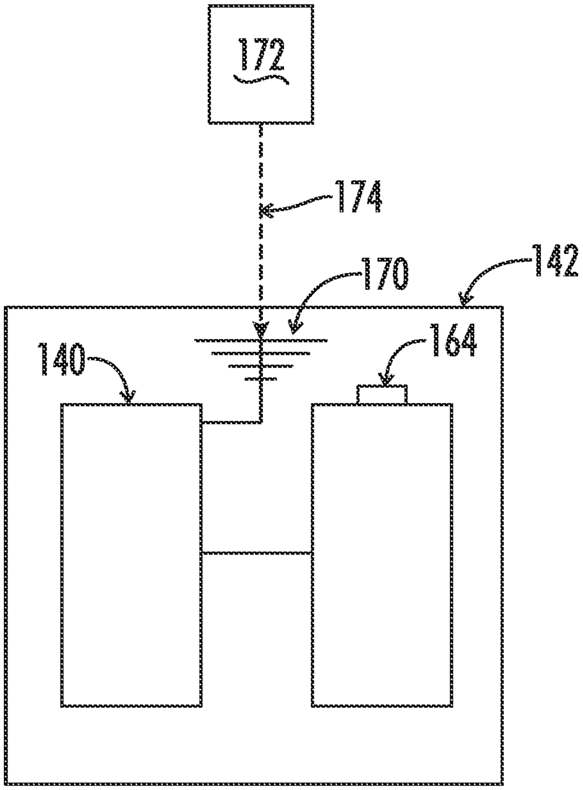
FIG. 9 is a block diagram showing components of the electronics housing of the musical instrument display system in accordance with the present disclosure.

In certain optional embodiments, the electronics control module 140 may be configured to be coupled to and receive power from an AC power source 160 external to the electronics housing 142. In accordance with such an embodiment, the electronics control module 140 may be coupled to the AC power source 160 using a power cable 162. In other optional embodiments, for example, as shown in FIG. 9, the electronics housing 142 may be configured to receive at least one battery 164 configured to provide power to each of the plurality of illumination modules 130. In further optional embodiments, the at least one battery 164 may be used in combination with the power cable 162, as known to one of ordinary skill in the art.

Figure 3A:
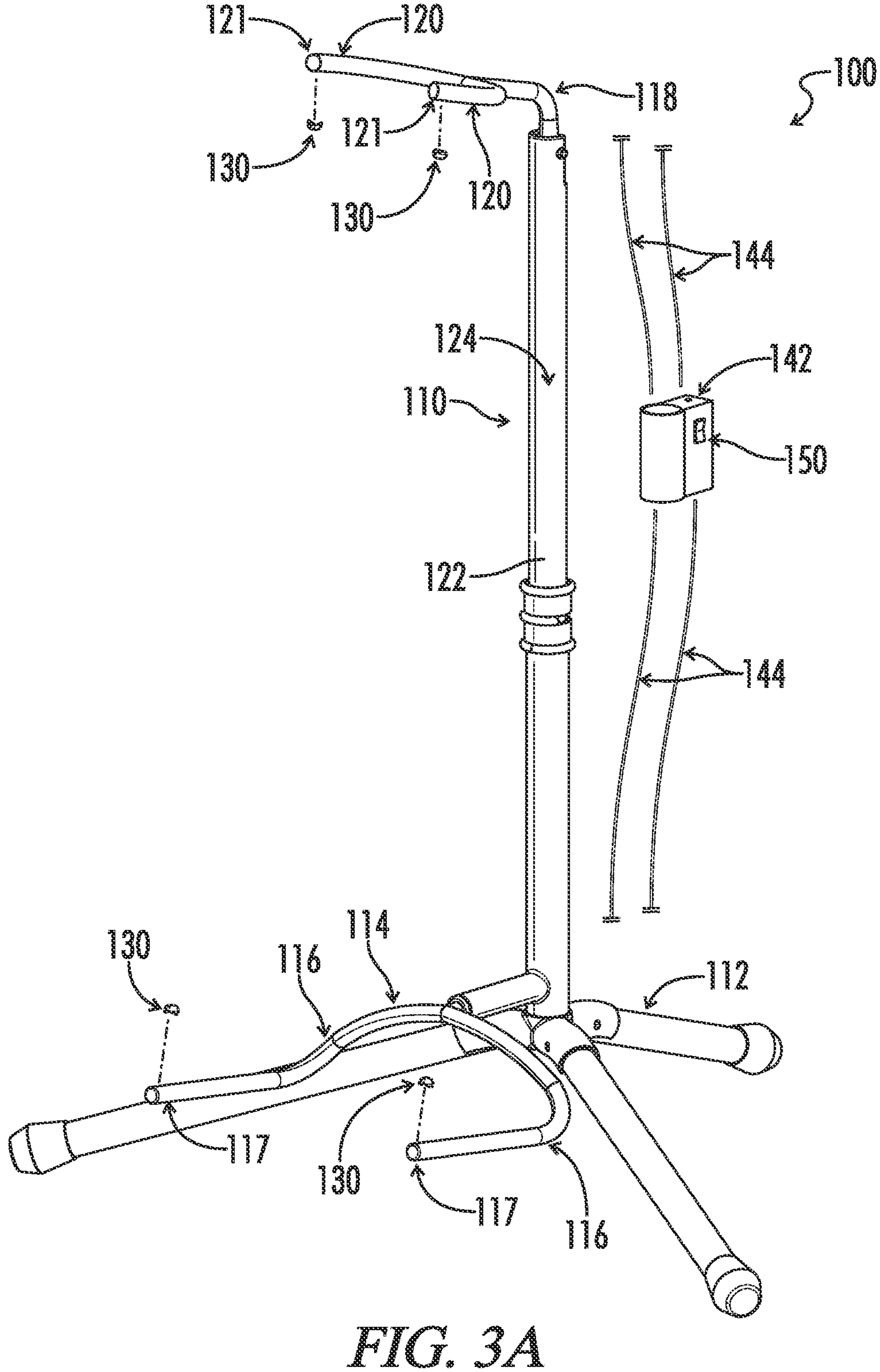
FIG. 3A is an exploded perspective view of the musical instrument display system of FIG. 2 in accordance with the present disclosure.
Figure 3B:
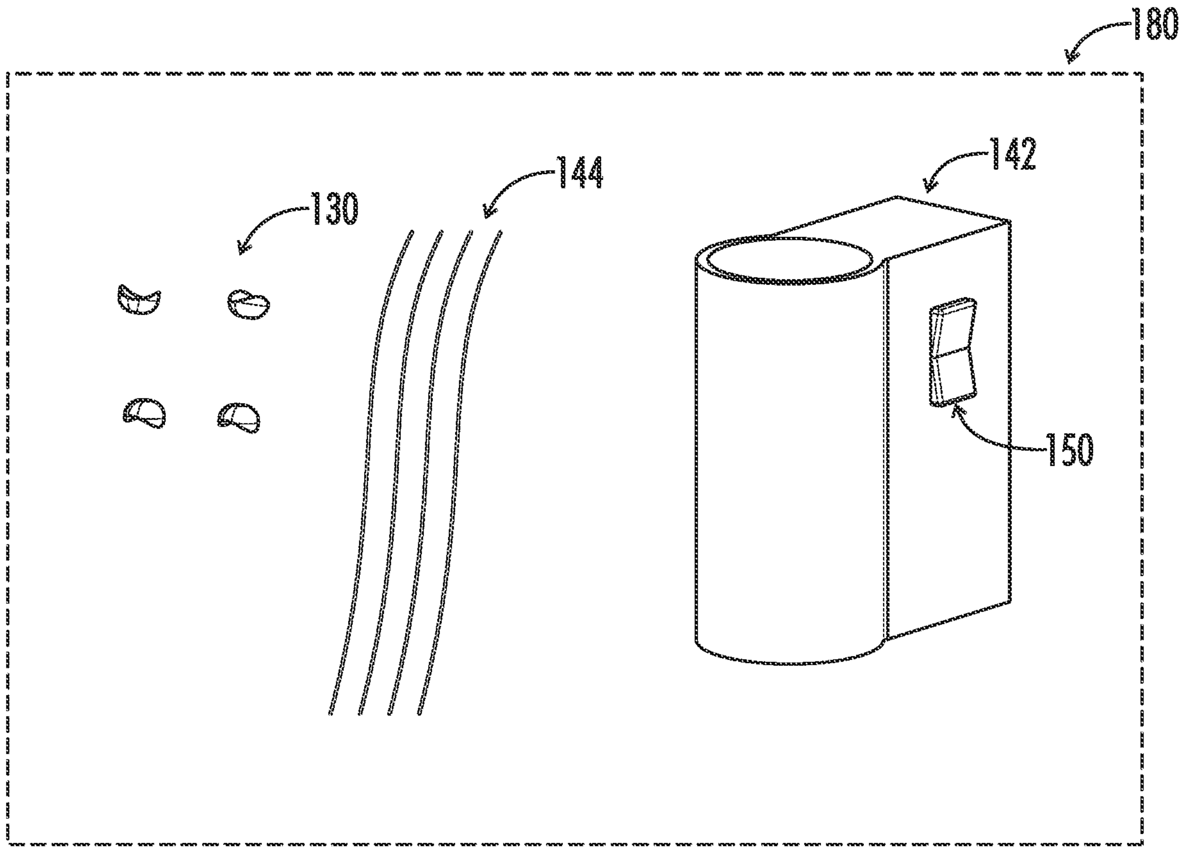
FIG. 3B is a perspective view of a retrofit kit for a musical instrument stand in accordance with the present disclosure.
Figure 4:
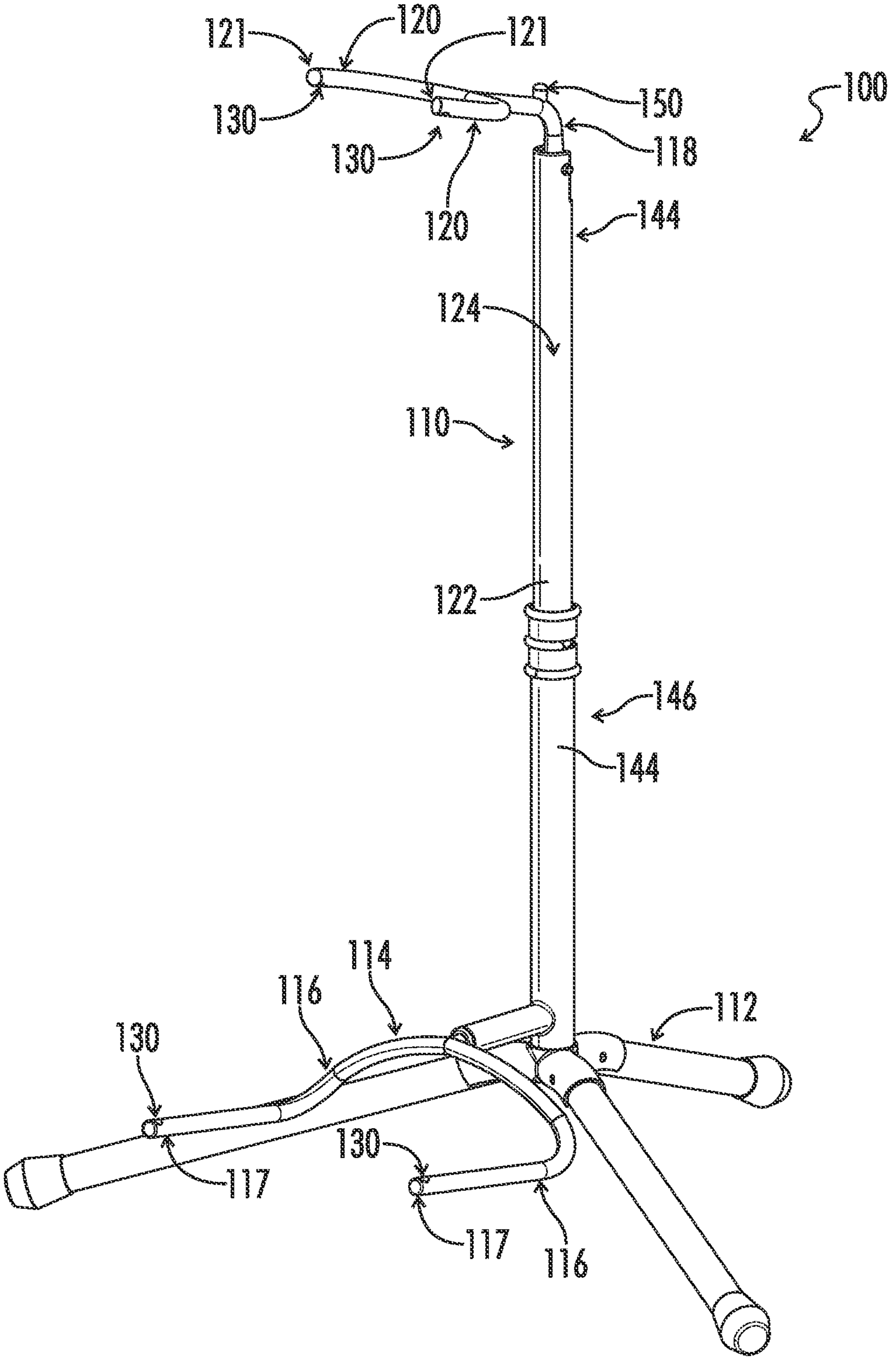
FIG. 4 is a perspective view of an embodiment of a musical instrument display system in accordance with the present disclosure.
Figure 5:
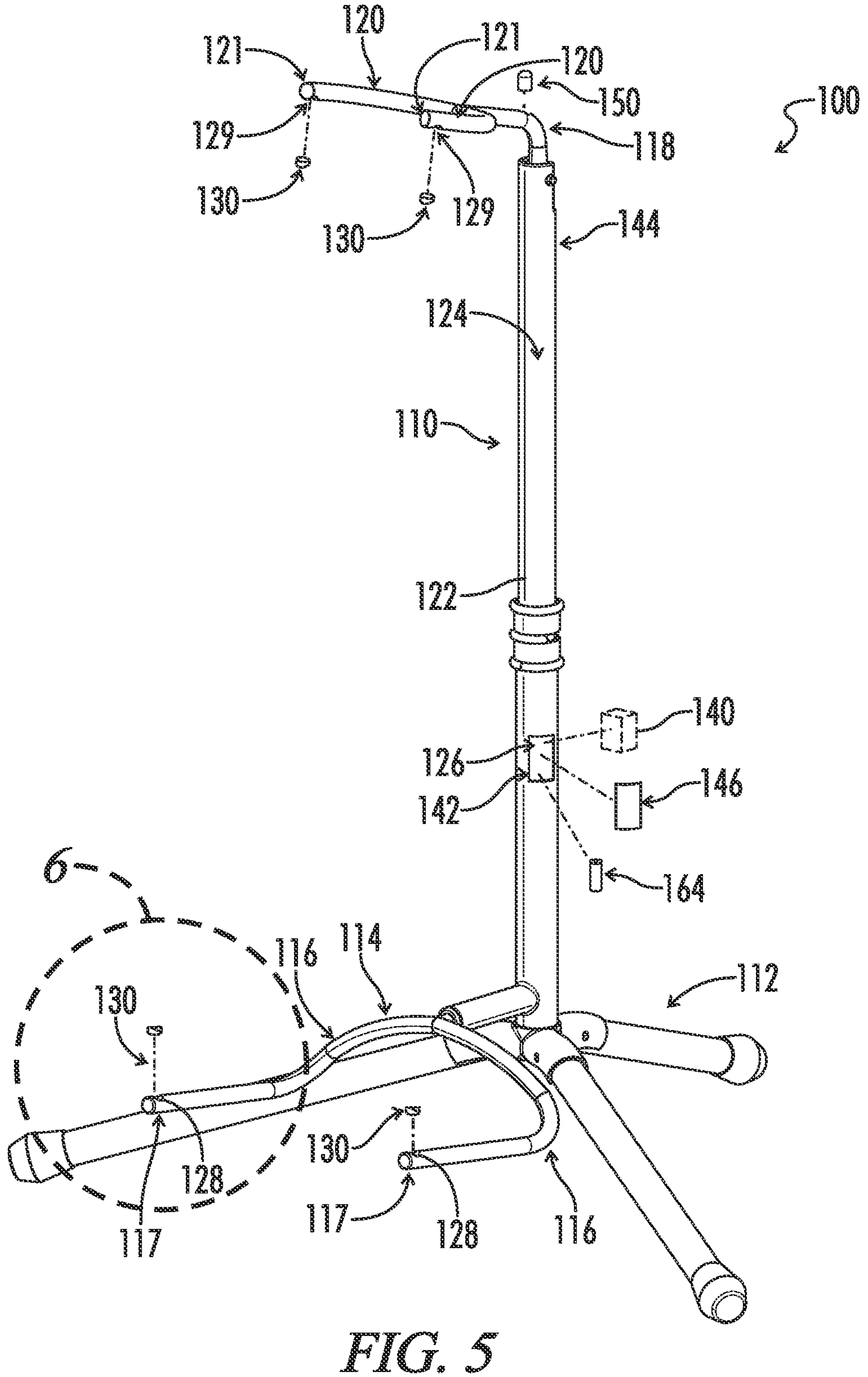
FIG. 5 is an exploded perspective view of the musical instrument display system of FIG. 4 in accordance with the present disclosure.

The musical instrument display system 100 may further include a power switch 150 coupled to one of the electronics housing 142 (shown in FIGS. 2-3B) or the musical instrument stand 110 (shown in FIGS. 4-5). The power switch 150 may be configured to control the transmission of power from the electronics control module 140 to the plurality of illumination modules 130.

The electronics control module 140 may comprise a controller, one or more drivers, and the like configured to control the transmission of power to the plurality of illumination modules 130. In certain optional embodiments, the controller may include a processor, a computer readable memory medium, a database, and/or an input/output module or control panel having a display.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The term "computer-readable memory medium" as used herein may refer to any non-transitory medium alone or as one of a plurality of non-transitory memory media within which is embodied in a computer program product that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

As illustrated in FIG. 9, the electronics control module 140 may be coupled to a wireless transceiver 170 positioned within the electronics housing 142. The wireless transceiver 170 may utilize radio frequency (RF), Bluetooth, Bluetooth Low Energy, WiFi, cellular, pulse light, or the like. The wireless transceiver 170 may be configured to receive signals 174 from an external device 172 (such as a personal mobile device or the like) for controlling an operational state of the plurality of illumination modules 130. In certain optional embodiments, the operational state may be an on-state or an off-state. In other optional embodiments, the operational state may include a color of light 190 emitted from the plurality of illumination modules 130. In further optional embodiments, the plurality of illumination modules 130 may be dimmable.

Figure 2:
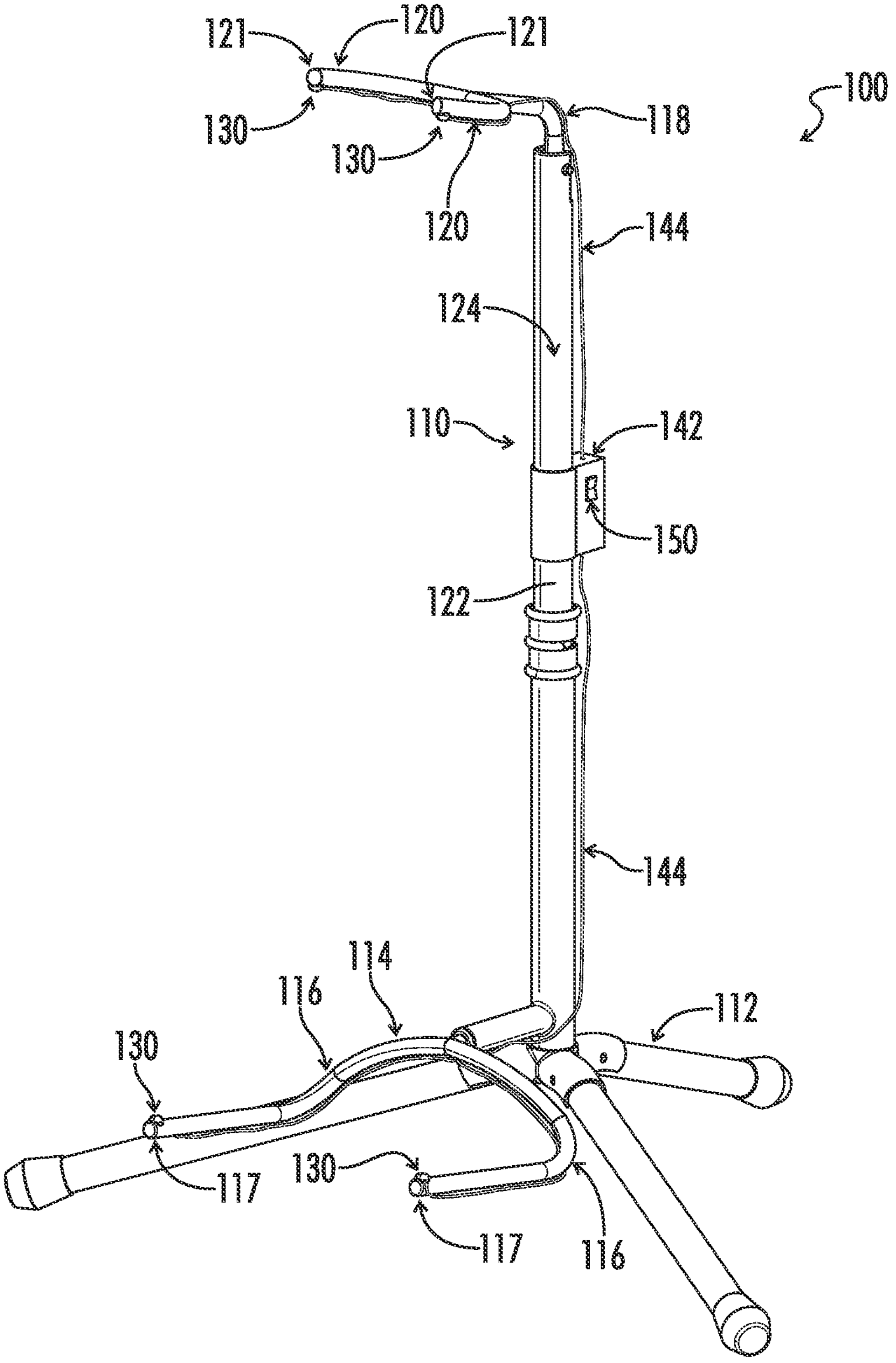
FIG. 2 is a perspective view of the musical instrument display system of FIG. 1 in accordance with the present disclosure.

As illustrated in FIGS. 2 and 3A, each of the electronics housing 142, the plurality of illumination modules 130, and the plurality of cables 144 may be removably coupled to an exterior 124 of the musical instrument stand 110. As illustrated in FIG. 3B, a retrofit kit 180 for a user's already owned instrument stand may be defined as including the electronics housing 142, the plurality of illumination modules 130, and the plurality of cables 144. Each of these elements may be coupled to the musical instrument stand 110 using any coupling means now known or to be discovered, such as, for example, adhesives, Velcro®, straps, clips, magnets, or the like.

Figure 6:
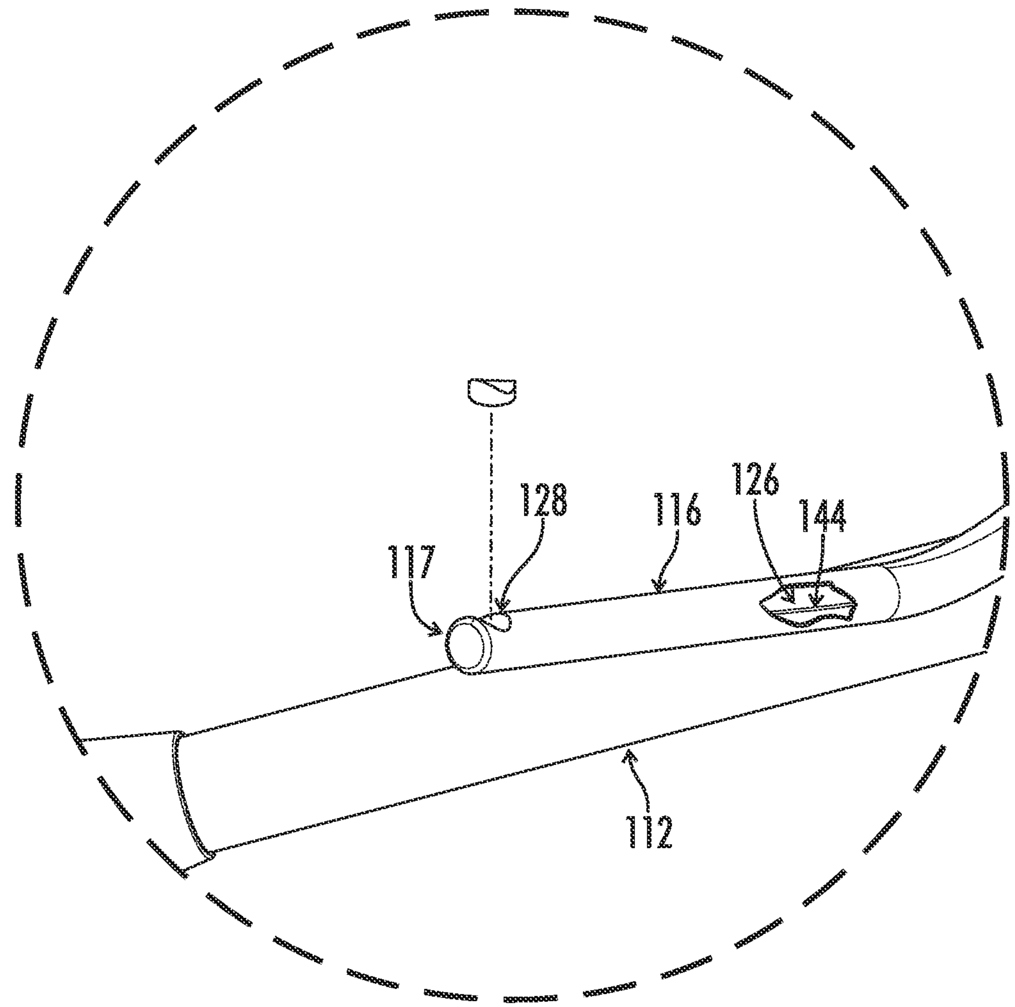
FIG. 6 is an enlarged perspective view of the musical instrument display system of FIG. 4 taken of dashed area 6 shown in FIG. 5 in accordance with the present disclosure.

As illustrated in FIGS. 4-5, each of the electronics housing 142, the plurality of illumination modules 130, and the plurality of cables 144 may be integrated into the musical instrument stand 110. As illustrated in FIG. 6, the musical instrument stand 110 may include an internal cavity 126 open between the pair of lower arms 116 and the pair of upper arms 120. Accordingly, the post 122 also includes the internal cavity 126 (shown in FIG. 5 only). The plurality of cables 144 may be positioned within the internal cavity 126. In accordance with this embodiment, each of the pair of lower arms 116 may include an opening 128 configured to receive one of the plurality of illumination modules 130. Likewise, each of the pair of upper arms 120 may include an opening 129 configured to receive one of the plurality of illumination modules 130. The openings 128, 129 may be positioned proximate to (shown in FIGS. 5-6) or at (shown in FIG. 8) the free ends 117, 121 of each of the lower and upper pairs of arms 116, 120, respectively. The openings 128 should be positioned such that when a musical instrument 102 is positioned on the musical instrument stand 110, the openings 129, and thus the associated illumination modules 130, are not covered by the musical instrument 102.

As further illustrated in FIG. 5, the electronics housing 142 may be at least partially defined within the internal cavity 126 of the musical instrument stand 110. In such embodiments, an access cover plate 146 may be removably coupled to the musical instrument stand 110 for accessing the at least one battery 164 and/or the electronics control module 140.

Figure 7:
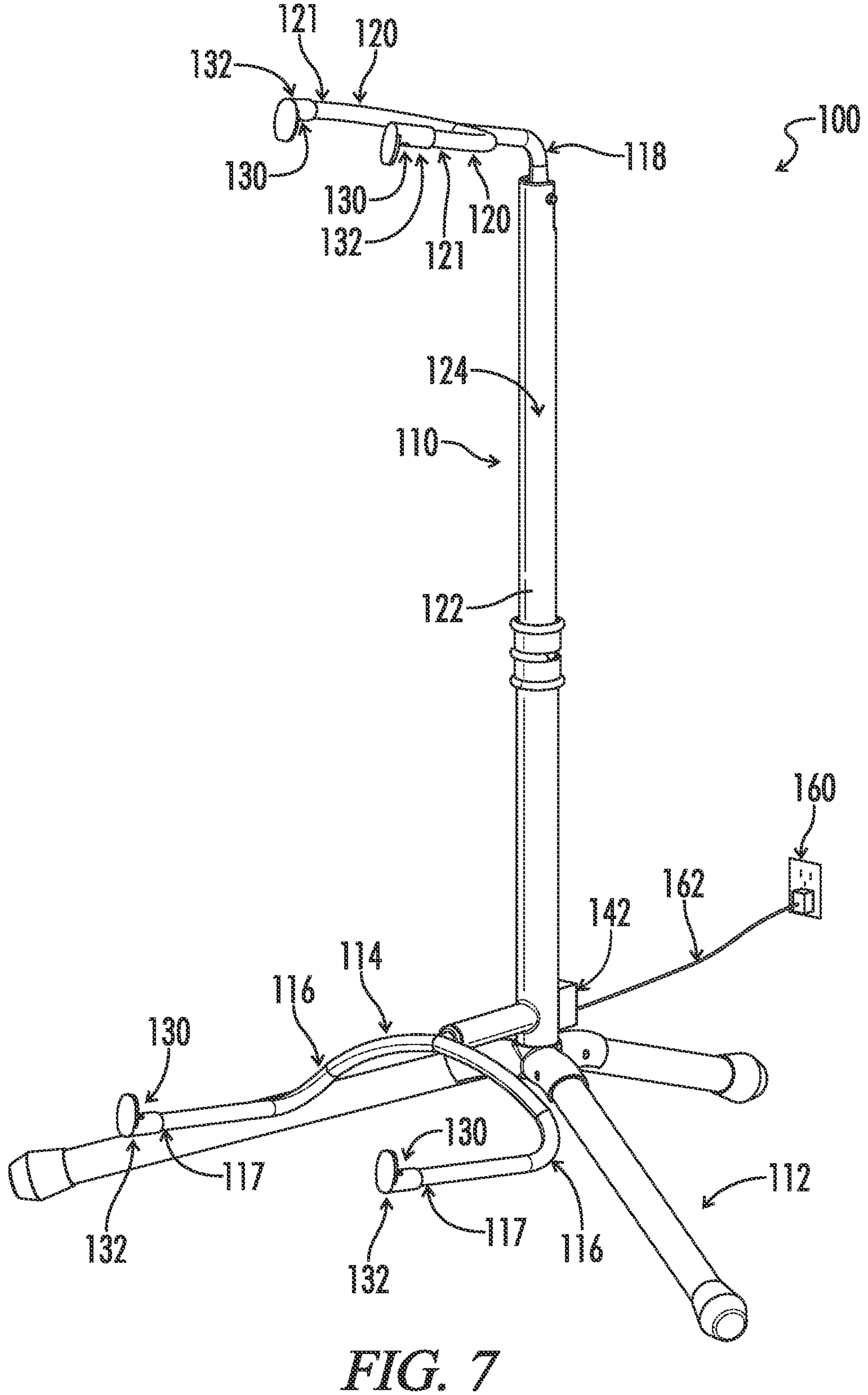
FIG. 7 is a perspective view of an embodiment of a musical instrument display system in accordance with the present disclosure.
Figure 8:
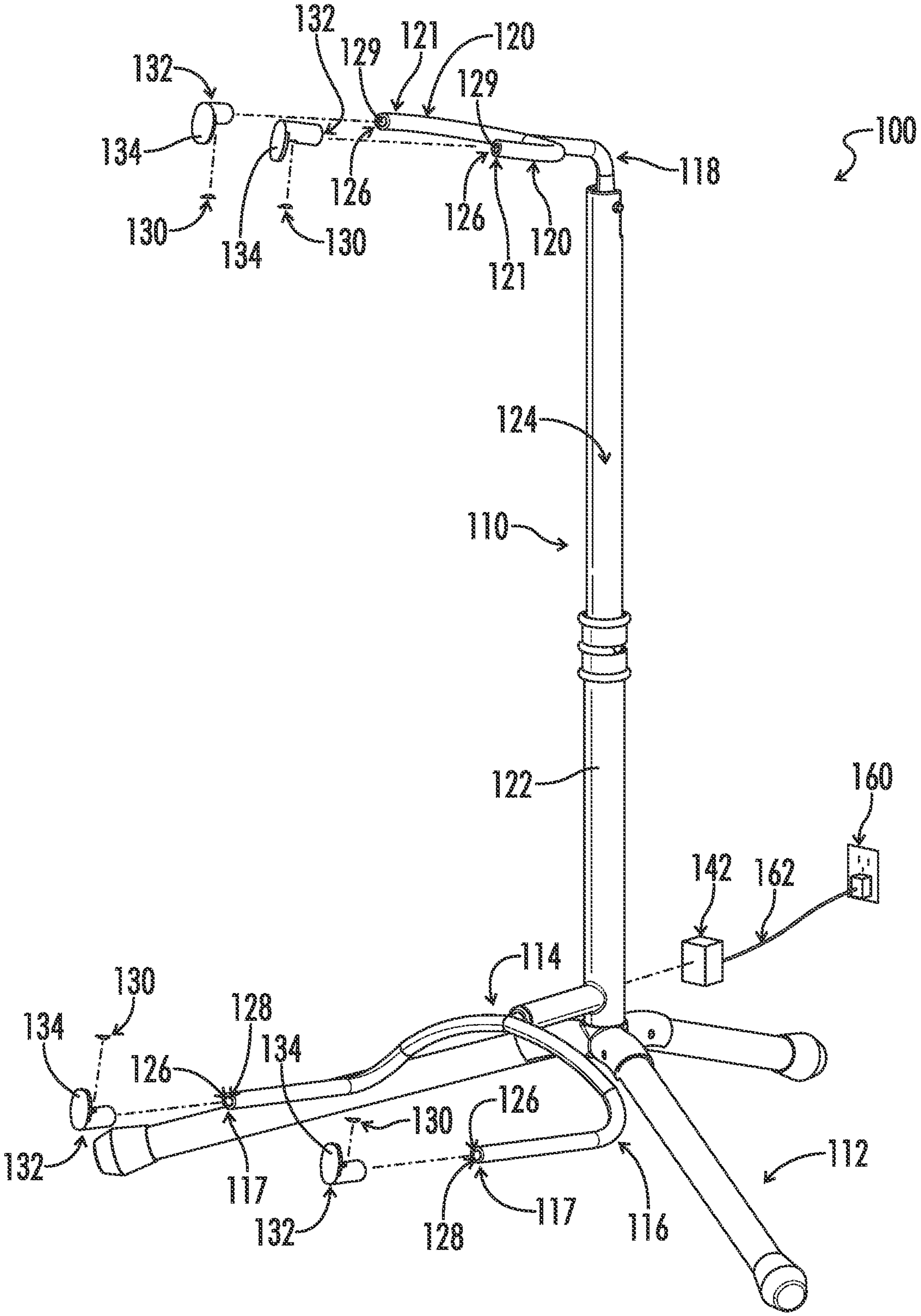
FIG. 8 is an exploded perspective view of the musical instrument display system of FIG. 7 in accordance with the present disclosure.

In certain instances, one or both of the lower and upper pairs of arms 116, 120 may not be long enough for mounting the illumination devices thereto in a downward or upward configuration such that emitted light 190 therefrom projects onto the front side 104 of the musical instrument 102. Referring to FIGS. 7-8, in such instances, the musical instrument display system 100 may include free end adapters 132 configured to house one or more of the plurality of illumination modules 130 and further configured to be received by one of the free ends 117, 121 of the lower or upper pairs of arms 116, 120. Each of the free end adapters 132 may include a reflector (or deflector) 134 configured to help direct the emitted light 190 from each of the plurality of illumination modules towards the front side 104 of the musical instrument 102. In certain other optional embodiments, not shown, the reflector 134 may be integrally formed into each of the plurality of illumination modules 130. Each of the free end adapters 132 may be formed from silicon or the like.

In certain optional embodiments, the free end adapters 132 may optionally be included with the retrofit kit 180.

In certain optional embodiments, the musical instrument stand 110 may only include the pair of lower arms 116 or the pair of upper arms 120. In such an embodiment, the retrofit kit 180 may still be applicable therefor and may only project light upward along the front side 104 of the musical instrument 102 or downward along the front side 104 of the musical instrument 102.

Figure 10:
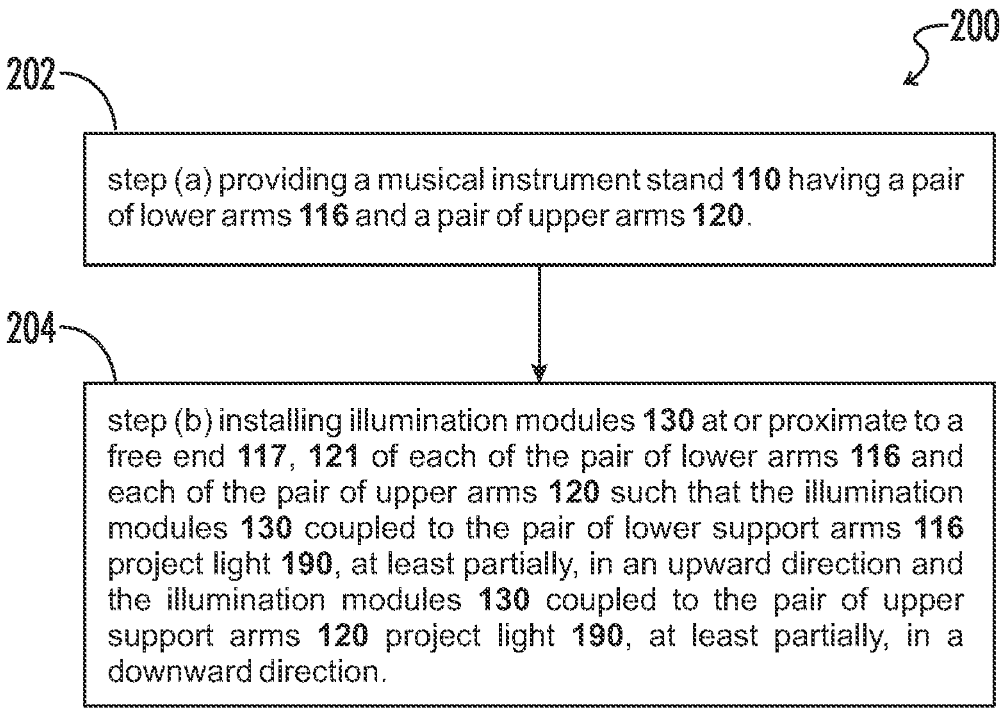
FIG. 10 is a flowchart of a method of assembling the musical instrument display system in accordance with the present disclosure.

Referring to FIG. 10, a method 200 of assembling a musical instrument display system 100 is shown. The method 200 may include step (a) providing 202 a musical instrument stand 110 having a pair of lower arms 116 and a pair of upper arms 120. The method 200 may further include step (b) installing 204 illumination modules 130 at or proximate to a free end 117, 121 of each of the pair of lower arms 116 and each of the pair of upper arms 120 such that the illumination modules 130 coupled to the pair of lower arms 116 project light 190, at least partially, in an upward direction and the illumination modules 130 coupled to the pair of upper arms 120 project light 190, at least partially, in a downward direction.

In certain optional embodiments, the method 200 may further include activating the illumination modules 130 and projecting light 190 from the illumination modules 130 onto a front side 104 of the musical instrument 102 when received by the musical instrument stand 110.

In certain other optional embodiments, the method 200 may further include controlling a color of the light 190 produced by the illumination modules 130.

In further optional embodiments, the method 200 may further include receiving communications from an external device 172 to control the color of the light 190 produced by the illumination modules 130.

In certain optional embodiments, step (b) of the method 200 may further include positioning each of the illumination modules 130 into openings 128, 129 defined at or proximate to the free end 117, 121 of each of the pair of lower arms 116 and each of the pair of upper arms 120, respectively.

In certain other optional embodiments, the method 200 may further include installing an electronics control module 140 onto or within the musical instrument stand 110 and electrically coupling each of the illumination modules 130 to the electronics control module 140 using cables 144. The method 200 may further include providing power to the electronics control module 140 using at least one battery 164 coupled to the electronics control module 140.

In other optional embodiments, the method 200 may further include, prior to step (b), providing a retrofit kit 180 comprising the illumination modules 130, the electronics control module 140, and the plurality of cables 144.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A musical instrument display system for illuminating a stringed musical instrument characterized as having an enlarged body and a narrow neck extending therefrom, the musical instrument display system comprising:

a musical instrument stand having a base portion configured to be supported by a ground surface, a lower instrument support portion having a pair of lower arms configured to support the enlarged body of the stringed musical instrument above the ground surface, and an upper instrument support portion vertically offset from the lower instrument support portion and having a pair of upper arms configured to receive the narrow neck of the stringed musical instrument therebetween when the stringed musical instrument is received by the musical instrument stand;

a plurality of illumination modules, at least one of the plurality of illumination modules coupled to each of the pair of lower arms for projecting light upwards along a front surface of the stringed musical instrument when the stringed musical instrument is received by the musical instrument stand, at least one other of the plurality of illumination modules coupled to each of the pair of upper arms for projecting light downwards along the front surface of the stringed musical instrument when the stringed musical instrument is received by the musical instrument stand; and an electronics housing coupled to the musical instrument stand and including an electronics module positioned therein, the electronics module electrically coupled to each of the plurality of illumination modules using a plurality of cables for selectively transmitting power to each of plurality of illumination modules.

2. The musical instrument display system of claim 1, wherein:

the electronics module is configured to be coupled to and receive power from an AC power source external to the electronics housing.

3. The musical instrument display system of claim 1, wherein:

the electronics housing is configured to receive at least one battery configured to provide power to each of the plurality of illumination modules.

4. The musical instrument display system of claim 1, further comprising:

a power switch coupled to one of the electronics housing or the musical instrument stand and configured to control transmission of power from the electronics module to the plurality of illumination modules.

5. The musical instrument display system of claim 1, wherein:

the musical instrument stand further includes an internal cavity open between the pair of lower arms and the pair of upper arms; and the plurality of cables are positioned within the internal cavity.

6. The musical instrument display system of claim 5, wherein:

each of the pair of lower arms includes an opening configured to at least partially receive one of the plurality of illumination modules; and each of the pair of upper arms includes an opening configured to at least partially receive one of the plurality of illumination modules.

7. The musical instrument display system of claim 6, wherein:

the opening of each of the pair of lower arms and the opening of each of the pair of upper arms is positioned proximate to a respective free end thereof.

8. The musical instrument display system of claim 5, wherein:

the electronics housing is defined at least partially by the internal cavity.

9. The musical instrument display system of claim 1, wherein:

each of the electronics housing, the plurality of cables, and the plurality of illumination modules are removably coupled to an exterior of the musical instrument stand and collectively define a retrofit kit.

10. The musical instrument display system of claim 1, wherein:

the electronics module is coupled to a wireless transceiver positioned within the electronics housing and configured to receive signals from an external device for controlling an operational state of the plurality of illumination modules.

11. The musical instrument display system of claim 1, wherein:

each of the plurality of illumination modules comprises at least one light emitting diode.

12. A method of assembling a musical instrument illumination system, the method comprising:

(a) providing a musical instrument stand having at least one of a pair of lower support arms or a pair of upper support arms; and (b) installing illumination devices at or proximate to a free end of each of the pair of lower support arms and each of the pair of upper support arms such that the illumination devices coupled to the pair of lower support arms are configured to project light at least partially in an upward direction and the illumination devices coupled to the pair of upper support arms are configured to project light at least partially in a downward direction.

13. The method of claim 12, further comprising:

activating the illumination devices; and projecting light from the illumination devices onto a front surface of a musical instrument when received by the musical instrument stand.

14. The method of claim 12, further comprising:

controlling a color of light produced by each of the illumination devices.

15. The method of claim 14, further comprising:

receiving communications from an external device to control the color of the light produced by each of the illumination devices.

16. The method of claim 12, wherein step (b) further comprises:

positioning each of the illumination devices into an opening defined at or proximate to the free end of each of the pair of lower support arms and each of the pair of upper support arms.

17. The method of claim 12, further comprising prior to step (b):

providing a retrofit kit comprising the illumination devices, an electronics control module, and a plurality of cables configured to be coupled between the illumination devices and the electronics control module.

18. The method of claim 12, further comprising:

installing an electronics control module onto or within musical instrument stand; and electrically coupling each of the illumination devices to the electronics control module using cables.

19. The method of claim 18, further comprising:

providing power to the electronics control module using a battery.

20. A musical instrument display system comprising:

a ground supported musical instrument stand for supporting a stringed musical instrument;

a pair of lower arms configured to support a body of the stringed musical instrument;

a pair of upper arms configured to receive a neck of the stringed musical instrument;

a plurality of illumination means coupled to the pair of lower arms, the pair of upper arms, or both for projecting light along a front side of the stringed musical instrument received by the ground supported musical instrument stand; and a power control means coupled to the ground supported musical instrument stand and the plurality of illumination means for selectively enabling the plurality of illumination means.

* * * * *